US010822807B2

(12) United States Patent
Olvey et al.

(10) Patent No.: US 10,822,807 B2
(45) Date of Patent: Nov. 3, 2020

(54) ASSEMBLY FOR IMPROVED INSULATION (71) Applicant: Royal Building Products (USA) Inc., Columbus, OH (US)

(72) Inventors: Patrick Olvey, Columbus, OH (US); Chris J. Johnson, Columbus, OH (US)

(73) Assignee: ROYAL BUILDING PRODUCTS (USA) INC., Columbus, OH (US)

( * ) Notice: Subject to any disclaimer, the term of this patent is extended or adjusted under 35 U.S.C. 154(b) by 0 days.

(21) Appl. No.: 16/278,247

(22) Filed: Feb. 18, 2019

(65) Prior Publication Data
US 2020/0263435 A1  Aug. 20, 2020

(51) Int. Cl.
E04F 13/08 (2006.01)
E04C 2/284 (2006.01)
B32B 3/30 (2006.01)
B32B 5/18 (2006.01)

(52) U.S. Cl.
CPC ............ *E04F 13/0875* (2013.01); *B32B 3/30* (2013.01); *B32B 5/18* (2013.01); *E04C 2/284* (2013.01); *B32B 2266/0228* (2013.01); *B32B 2305/022* (2013.01); *B32B 2307/304* (2013.01); *B32B 2607/00* (2013.01)

(58) Field of Classification Search
CPC . E04F 13/075; E04F 13/0875; E04F 13/0864; E04D 3/352; E04D 3/355; E04B 1/803; E04C 2/246; E04C 2/284
See application file for complete search history.

(56) References Cited

U.S. PATENT DOCUMENTS 4,673,614 A * 6/1987 Wells .................. B32B 11/06
442/85
4,788,808 A * 12/1988 Slocum .................. E04C 2/246
52/309.15
(Continued)

FOREIGN PATENT DOCUMENTS

DE         29804099 U1 *  4/1998  ............. E04B 1/803
DE     202011101624 U1 *  3/2012  ............. E04B 1/803
DE     202011101624 U1     4/2012

OTHER PUBLICATIONS

Newport Partners. (Mar. 1, 2017) Modified Atmosphere Insulation</i>, Retrieved from http://web.archive.org/web/20170301112912/http://www.newportpartnersllc.com/technologies/structural_insulation_siding/modified_atmosphere_insulation.html. (Year: 2017).*
(Continued)

*Primary Examiner* — Christine T Cajilig
(74) *Attorney, Agent, or Firm* — Standley Law Group LLP; Jeffrey Standley; Jeffrey Norris (57) ABSTRACT An insulated panel assembly having improved insulative R-value. The insulated panel assembly comprises a cover panel, a first insulation layer, and at least one additional insulation layer, wherein the at least one additional insulation layer has a higher R-value than the first insulation layer. The first insulation layer is secured to the cover panel. The first insulation layer further forms at least one recessed portion. The at least one additional insulation layer is positioned in the at least one recessed portion of the first insulation layer. Examples of the at least one additional insulation layer may include vacuum insulated panels and modified atmosphere insulation panels.

18 Claims, 8 Drawing Sheets

Detail A-A

(56) References Cited

U.S. PATENT DOCUMENTS

| | | |
|---|---|---|
| 5,082,335 A * | 1/1992 | Cur .................. E04B 1/803 312/401 |
| 5,470,802 A | 11/1995 | Gnade et al. |
| 5,494,858 A | 2/1996 | Gnade et al. |
| 5,504,042 A | 4/1996 | Cho et al. |
| 5,523,615 A | 6/1996 | Cho et al. |
| 5,527,411 A * | 6/1996 | Jutte .................. B29C 70/525 156/204 |
| 5,561,318 A | 10/1996 | Gnade et al. |
| 5,565,142 A | 10/1996 | Deshpande et al. |
| 5,680,713 A | 10/1997 | Forbert et al. |
| 5,723,368 A | 3/1998 | Cho et al. |
| 5,736,425 A | 4/1998 | Smith et al. |
| 5,744,118 A | 4/1998 | Imamura et al. |
| 5,750,415 A | 5/1998 | Gnade et al. |
| 5,753,305 A | 5/1998 | Smith et al. |
| 5,788,950 A | 8/1998 | Imamura et al. |
| 5,789,819 A | 8/1998 | Gnade et al. |
| 5,795,556 A | 8/1998 | Jansen et al. |
| 5,804,508 A | 9/1998 | Gnade et al. |
| 5,807,494 A | 9/1998 | Boes et al. |
| 5,807,607 A | 9/1998 | Smith et al. |
| 5,847,443 A | 12/1998 | Cho et al. |
| 5,875,599 A * | 3/1999 | McGrath ............. E04B 1/803 52/586.2 |
| 5,877,100 A | 3/1999 | Smith et al. |
| 5,928,723 A | 7/1999 | Koehlert et al. |
| 5,955,140 A | 9/1999 | Smith et al. |
| 5,972,826 A | 10/1999 | Boes et al. |
| 6,010,762 A | 1/2000 | Smith et al. |
| 6,022,812 A | 2/2000 | Smith et al. |
| 6,037,275 A | 3/2000 | Wu et al. |
| 6,037,277 A | 3/2000 | Masakara et al. |
| 6,048,804 A | 4/2000 | Smith et al. |
| 6,063,714 A | 5/2000 | Smith et al. |
| 6,071,486 A | 6/2000 | Koehlert et al. |
| 6,090,439 A | 7/2000 | Menon et al. |
| 6,090,448 A | 7/2000 | Wallace et al. |
| 6,099,749 A | 8/2000 | Boes et al. |
| 6,107,350 A | 8/2000 | Boes et al. |
| 6,126,733 A | 10/2000 | Wallace et al. |
| 6,130,152 A | 10/2000 | Smith et al. |
| 6,131,305 A | 10/2000 | Forbert et al. |
| 6,132,837 A | 10/2000 | Boes et al. |
| 6,140,252 A | 10/2000 | Cho et al. |
| 6,159,295 A | 12/2000 | Masakara et al. |
| 6,159,540 A | 12/2000 | Menon et al. |
| 6,171,645 B1 | 1/2001 | Smith et al. |
| 6,172,120 B1 | 1/2001 | Smith et al. |
| 6,174,926 B1 | 1/2001 | Menon et al. |
| 6,208,014 B1 | 3/2001 | Wu et al. |
| 6,315,971 B1 | 11/2001 | Wallace et al. |
| 6,319,852 B1 | 11/2001 | Smith et al. |
| 6,319,855 B1 | 11/2001 | Hendricks et al. |
| 6,325,281 B1 * | 12/2001 | Grogan ............. B65D 81/3862 220/592.25 |
| 6,335,296 B1 | 1/2002 | Hendricks et al. |
| 6,344,240 B1 | 2/2002 | Menon et al. |
| 6,372,666 B1 | 4/2002 | Ramos et al. |
| 6,380,105 B1 | 4/2002 | Smith et al. |
| 6,395,651 B1 | 5/2002 | Smith et al. |
| 6,403,209 B1 | 6/2002 | Barton et al. |
| 6,410,149 B1 | 6/2002 | Hendricks et al. |
| 6,437,007 B1 | 8/2002 | Smith et al. |
| 6,438,992 B1 | 8/2002 | Smith et al. |
| 6,440,381 B1 | 8/2002 | Smith et al. |
| 6,455,130 B1 | 9/2002 | Wallace et al. |
| 6,474,100 B1 | 11/2002 | Smith et al. |
| 6,485,805 B1 | 11/2002 | Smith et al. |
| 6,495,479 B1 | 12/2002 | Wu et al. |
| 6,495,906 B2 | 12/2002 | Smith et al. |
| 6,503,850 B1 | 1/2003 | Wallace et al. |
| 6,518,205 B1 | 2/2003 | Wu et al. |
| 6,532,762 B2 | 3/2003 | Smith et al. |
| 6,544,618 B1 | 4/2003 | Smith |
| 6,559,071 B2 | 5/2003 | Ramos et al. |
| 6,559,096 B1 | 5/2003 | Smith et al. |
| 6,584,797 B1 | 7/2003 | Smith et al. |
| 6,591,630 B2 | 7/2003 | Smith et al. |
| 6,601,404 B1 | 8/2003 | Roderick |
| 6,610,145 B2 | 8/2003 | Hendricks et al. |
| 6,645,878 B2 | 11/2003 | Smith et al. |
| 6,670,022 B1 | 12/2003 | Wallace et al. |
| 6,688,132 B2 | 2/2004 | Smith et al. |
| 6,691,404 B2 | 2/2004 | Barton et al. |
| 6,701,724 B2 | 3/2004 | Smith et al. |
| 6,734,608 B1 | 5/2004 | Barton et al. |
| 6,821,554 B2 | 11/2004 | Smith et al. |
| 6,838,146 B2 | 1/2005 | Merrill et al. |
| 6,858,068 B2 | 2/2005 | Smith et al. |
| 6,863,713 B1 | 3/2005 | Ghosal et al. |
| 6,960,243 B1 | 11/2005 | Smith et al. |
| 6,968,711 B2 | 11/2005 | Smith et al. |
| 7,143,589 B2 | 12/2006 | Smith et al. |
| 9,133,973 B2 | 9/2015 | Smith |
| 9,598,857 B2 | 3/2017 | Smith |
| 9,726,438 B2 | 8/2017 | Smith |
| 9,849,405 B2 | 12/2017 | Smith |
| 9,957,099 B2 | 5/2018 | White et al. |
| 10,139,035 B2 | 11/2018 | Smith |
| 2009/0136703 A1 * | 5/2009 | Carolan ............. E04B 1/803 428/55 |
| 2013/0340953 A1 * | 12/2013 | Knutson ............. E06B 3/80 160/236 |
| 2015/0056404 A1 * | 2/2015 | Sawafta ............. F28D 20/02 428/106 |
| 2019/0186124 A1 * | 6/2019 | Hubbard ............. E04D 13/1643 |

OTHER PUBLICATIONS

Andre Desjarlais, Oak Ridge National Laboratory, Modified Atmosphere Insulation—Next Generation Insulation Material, May 18, 2015, pp. 1-18, Oak Ridge, Tennessee, USA.

Kaushik Biswas, PhD, Andre Desjarlais and Jerry Atchley, Oak Ridge National Laboratory, Patrick Olvey and Chris Johnson, Royal Building Products Co. Douglas Smith, PhD Nanopore, Inc., Thermal characterization of novel vacuum-insulated vinyl siding, May 16, 2017, 19 pgs, USA.

Nanopore, Vacuum Insulation Panels (VIPs), http://www.nanopore.com/vip.html, screen shots accessed from Internet Archive WayBackMachine, 1 page, archive page dated Oct. 15, 2018.

Nanopore, Insulated Shipping Containers, http://www.nanopore.com/shipping.html, screen shots accessed from Internet Archive WayBackMachine, 2 pages, archive page dated Sep. 12, 2018.

Nanopore, NanoPoreTM Thermal Insulation, http://www.nanopore.com/thermal.html, screen shots accessed from Internet Archive WayBackMachine, 2 pages, archive page dated Oct. 13, 2018.

Nanopore, Specialty Porous Materials, http://www.nanopore.com/special.html, screen shots accessed from Internet Archive WayBackMachine, 2 pages, archive page dated Sep. 12, 2018.

Nanopore, NanoglassTM, http://www.nanopore.com/lowk.html, screen shots accessed from Internet Archive WayBackMachine, 2 pages, archive page dated Aug. 28, 2018.

Nanopore, Products, http://www.nanopore.com/products.html, screen shots accessed from Internet Archive WayBackMachine, 2 pages, archive page dated Oct. 22, 2018.

Nanopore, Modified Atmosphere Insulation, http://www.newportpartnersllc.com/technologies/structural_insulation_siding/modified_atmosphere_insulation.html, screen shots accessed from Internet Archive Newport Partners LLC, 2 pages, archive page dated Mar. 1, 2017.

* cited by examiner

ASSEMBLY FOR IMPROVED INSULATION

BACKGROUND AND SUMMARY OF THE INVENTION

Exemplary embodiments of the present invention include systems and methods for insulating an outer member (e.g., a panel, door, garage door, wall, etc.). Exemplary embodiments are described herein with respect to a siding panel. Similar principles may also be applied with respect to other types of outer members to achieve improved insulation. Accordingly, unless expressly set forth otherwise, exemplary embodiments of the present invention are not limited to use with any particular type, configuration, shape, size, material construction, or purpose of outer member. For instance, examples of a siding panel are available in a number of shapes, configurations, and material constructions, and may be used for a variety of residential, commercial, or other purposes.

An uninsulated siding panel typically has poor insulating characteristics. For example, uninsulated siding panels comprised of plastic (e.g., vinyl) or metal (e.g., aluminum, steel, etc.) often have a very low R-value. As a result, it is known to provide a foam panel on the back of a siding panel to increase the insulating characteristics of the siding panel. For instance, one example of a foam backer may be comprised of expanded polystyrene (i.e., EPS) foam. In one example, the use of an EPS backer may result in a siding panel unit or assembly (hereinafter referred to as a siding panel assembly for ease of reference) having an R-value less than 3. The R-value is limited by the physical dimensions and material composition of the foam backer.

There is a need to be able to increase the insulating characteristics of an assembly comprising an outer cover (e.g., a siding panel assembly or insulated panel assembly). There is also a need to be able to be improve the insulating characteristics of an assembly comprising an outer cover (e.g., a siding panel assembly or insulated panel assembly) by providing a backer that is similar or smaller in size as compared to a traditional foam backer for the assembly. A need also exists to provide another insulating material in addition to a foam backer for an assembly. A further need exists to integrate another insulating material with a foam backer for an assembly. In addition, there is a need to be able to incorporate higher R-value materials in an assembly comprising an outer cover (e.g., a siding panel assembly or insulated panel assembly). Finally, there is a need for improved insulation assemblies that may serve a variety of purposes.

Vacuum insulated panels (VIPs) are an established technology for increasing R-value, but their use is limited. VIPs are much better insulators than conventional products, but they are expensive, cannot be modified or are difficult to modify in the field, and may show a loss of performance over time as the vacuum seal gradually degrades. For those reasons, VIPs are often a specialty product useful in some situations but not as a replacement for conventional types of building insulation.

Some walls of houses, building walls, garage doors, and rooftops of buildings are often crowded with mechanical equipment and access hatches, or may have other space limitations which may make it difficult if not economically impossible to achieve a high insulative value. There is a need to be able to effectively utilize insulation that has high R-value when space is a key issue. For example, a high R-value panel effectively applied to the outside of a house may be enough to meet current energy codes in the continental U.S., even if the house has no cavity insulation.

Despite the advantages of VIPs, one major problem of using them are wall areas where standard sized sheets or half sheets will not fit. Some potential solutions are to use modified atmosphere insulation panels (MAIs). MAIs may be a good candidate for next-generation insulation materials and may do so at a lower cost alternative to current vacuum insulation materials. However, like VIPs, MAI sheets cannot be cut in the field without piercing the barrier and losing the vacuum, thus significantly degrading the R-value of the MAIs. In addition, the R-value of MAIs may also degrade over time. In addition, MAIs often have a non-stick cover that makes it difficult to secure the panel to another surface. There is therefore a need to be able to effectively utilize MAIs, as well as VIPs or other high R-value insulation.

Exemplary embodiments of the present invention may satisfy some or all of these needs. For instance, an exemplary embodiment of an assembly comprising an outer cover (e.g., a siding panel assembly or insulated panel assembly) may incorporate and integrate a higher R-value material with a backer that is comprised of a relatively lower R-value material (e.g., a foam backer). As a result of the higher R-value material in some exemplary embodiments, a resulting assembly may have a higher R-value as compared to a similar assembly having only a traditional foam backer. In another exemplary embodiment, a higher R-value material may be included with a relatively lower R-value material to form a backer assembly, wherein the resulting backer assembly may have similar or smaller physical dimensions than a traditional foam backer for that type of outer cover. In such exemplary embodiments, a resulting assembly may still have an equivalent or preferably higher R-value as compared to a similar assembly having only a traditional foam backer. In yet another embodiment, a higher R-value material may be incorporated and integrated with a relatively lower R-value material to form an insulation assembly, which may be useful for a variety of different purposes not limited to a siding panel assembly (e.g., cavity insulation, basement wall insulation, garage door insulation, residential door insulation, etc.).

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed toward the use of the device described herein such as for a siding panel assembly for a house or building. For instance, examples of a siding panel are available in a number of shapes, configurations, and material constructions, and may be used for a variety of residential, commercial, or other purposes. However, as aforementioned, the benefits of an exemplary embodiment may also be applicable to other types of outer members and purposes.

Turning now to the figures, the various embodiments of the invention will be described in particular. FIGS. 1-4 show an exemplary embodiment of siding panel assembly 10. The siding panel assembly 10 is comprised of a siding panel 20 (i.e., a first or exterior cover layer or outer member or cover) and an insulation assembly 30. A siding panel 20 may be molded to any desired shape. Moreover, the siding panel 20 and the insulation assembly 30 may be formed so that they may be joined (e.g., with an adhesive), interlocked, or otherwise connected with each other in any suitable manner. For example, such as in this embodiment, an insulation assembly 30 may be formed to generally conform and be secured (e.g., with an adhesive) to the inside of siding panel 20. In other embodiments, an insulation assembly may have another desired shape such as for another purpose.

In this embodiment, the siding panel 20 may provide a desired aesthetic appearance such as for use on a home or other building. For instance, in one exemplary embodiment, a siding panel 20 (and siding panel assembly 10) may be interlocked, joined, or otherwise connected to other similar panels to completely cover the side of a home or building. The siding panel 20 may also assist in protecting the insulation assembly 30 from damage from the environment. The siding panel 20 (or other outer member) may be made of any material that meets the design specifications of the desired use. Examples of materials that may be used to create the siding panel 20 may include, but are not limited to, vinyl, polyvinyl chloride, high density polyethylene, low density polyethylene, polypropylene, polyvinyl acetate, polystyrene, cured epoxy resin, shape memory polymers, polymer composites (e.g., cellulosic and/or inorganic-filled composites), metals (e.g., aluminum, steel, etc.), shape memory metals, alloys, or other similar or suitable materials.

Insulation assembly 30 may be comprised of a first insulation layer 40 and at least one higher R-value material layer 50 (i.e., an additional insulation layer). The first insulation layer 40 may be made of any suitable insulative material. In one embodiment, the first insulation layer 40 may be comprised of expanded polystyrene (EPS) foam. In other exemplary embodiments, other suitable insulative materials may include, but are not limited to, molded fibers, wood, formed metals or alloys, polylactide, organic fibers such as wool or felt, molded paper board, and plastics. Still other materials that may act as a thermal insulator may be used to create the first insulation layer 40. The first insulation layer 40 may be shaped (e.g., molded, cut, configured, etc.) in whatever design is suited for the intended purpose and use with the at least one additional insulation layer 50, as set forth herein.

In an exemplary embodiment, the additional insulation layer 50 may increase the insulative R-value of the insulation assembly 30 as well as the siding panel assembly 10. The additional insulation layer 50 may be comprised of any material that will increase the overall R-value of the insulation assembly 30 (as compared to only the first insulation layer 40). In one embodiment, the additional insulation layer 50 may be a type of vacuum insulated panel. In one example, the additional insulation layer 50 may be integrated or otherwise incorporated with currently available or future insulated siding materials in order to develop a siding panel assembly with an R-value of >10 as determined by test method ASTM C1363.

More particularly, in one embodiment, a vacuum insulated panel (VIP) may be a modified atmosphere insulation panel (MAI). MAI technology is a type of vacuum insulated panel (VIP) as discussed previously. Where some examples of VIPs may use metal and air, some examples of MAIs may use a metal or polymer-coated foam. An example of a VIP may be created by removing some of the air out of the panel and sealing it tightly while maintaining a vacuum in the panel. As a result, a VIP may have a significantly higher insulation R-value as compared to traditional EPS foam insulation. An example of a MAI panel may be formed by condensation of steam that replaces air. In one exemplary manufacturing method, the core may be evacuated to approximately 50 mbar, followed by replacement of the remaining air with steam. Condensation of the steam during the forming step may create a final vacuum of approximately 5 mbars in one exemplary embodiment. Overall, an example of a MAI Panel may provide similar performance as other types of vacuum insulation panels, at 40-50% less cost. However, unless expressly set forth otherwise, it is not intended to limit a VIP or MAI panel to any particular materials, construction, manufacturing method, or degree of performance.

In one example, a MAI panel from NanoPore, Inc., measuring 6 inches wide by 24 inches long, may be used. The size of panels produced by NanoPore is limited by their current manufacturing technology. However, other companies, such as Dow Corning, Inc. may produce panels of varying sizes and R-values. Accordingly, one skilled in the art may now or in the future purchase and/or make VIPs or MAIs of the size and R-value needed for each desired embodiment.

Figure 2:
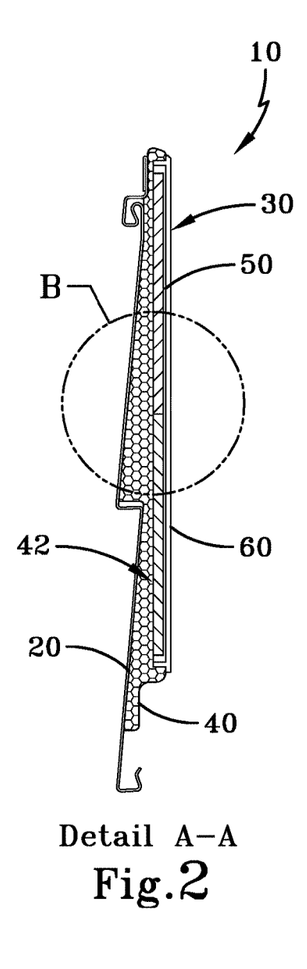
FIG. 2 is a cross-sectional view of the siding panel assembly of FIG. 1 along line A-A, which further indicates a Detail B.
Figures 3, 4:
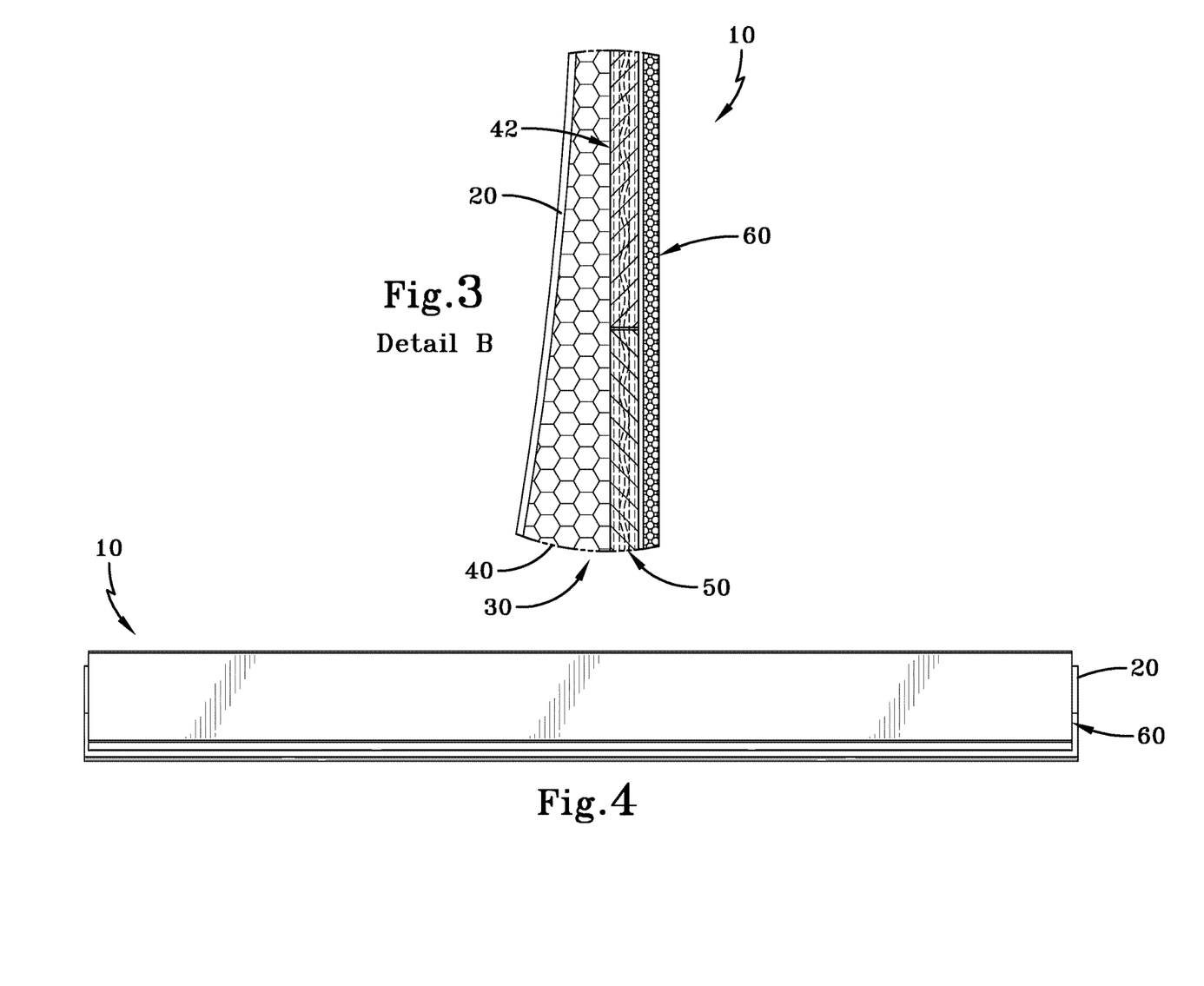
FIG. 3 shows Detail B of FIG. 2, wherein the exemplary embodiment of the siding panel assembly comprises a first cover layer, a first insulation layer, at least one additional insulating layer, and a back cover.
FIG. 4 is a rear elevation view of the siding panel assembly of FIG. 1.

The at least one additional insulation layer 50 is integrated or otherwise incorporated with the first insulation layer 40. For example, the at least one additional insulation layer 50 may be positioned in a recessed portion or portions 42 of the first insulation layer 40. Examples of a recessed portion 42 may include, but are not limited to, pockets, holes, cavities, slots, tracks, channels, openings, etc. FIGS. 2 and 3 show one example of a cavity 42 in a rear surface of first insulation layer 40. In other embodiments, a recessed portion or portions 42 may be located in another location on a first insulation layer 40 (e.g., a front surface, edge, or end of a first insulation layer 40). Also, a recessed portion 42 may be contained within the edge and end boundaries of a first insulation layer 40, or a recessed portion 42 may extend through at least one edge or end boundary of a first insulation layer 40.

Furthermore, in some preferred embodiments, an at least one additional insulation layer 50 may be insertable and removable with respect to a first insulation layer 40 as needed, such as during the installation of a siding panel assembly. For example, a temporary retention system (e.g., tape) may be used to secure an at least one additional insulation layer 50 in order to allow for insertion and removal, as needed (e.g., to avoid cutting). In some other exemplary embodiments, an at least one additional insulation layer 50 may not be adapted to be removed from a first insulation layer 40 and/or outer cover 20. For instance, in some other exemplary embodiments, an at least one additional insulation layer 50 may be permanently secured to a first insulation layer 40 and/or an outer cover 20.

Figure 1:
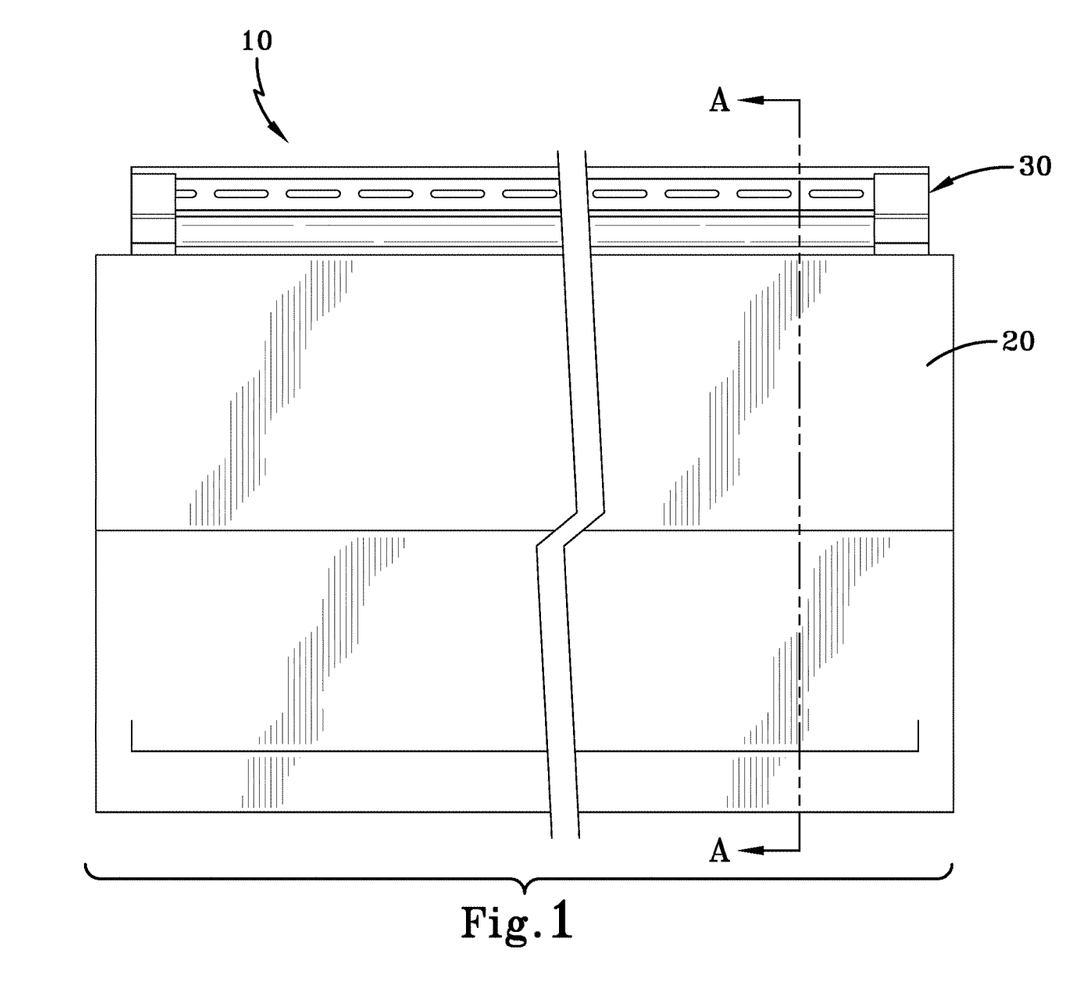
FIG. 1 is a front plan view of an exemplary embodiment of a siding panel assembly, which indicates a cross-section line A-A.

In the embodiment shown in FIG. 1, insulation assembly 30 may further comprise an additional back cover layer 60 that is designed and formed to attach to the first insulation layer 40 and/or siding panel 20 and provide support to keep the at least one additional insulation panel 50 in place. In particular, in this embodiment, the back cover layer 60 is attached to the first insulation layer 40. The back cover layer 60 may assist in supporting or otherwise holding the at least one additional insulation panel 50 in place such as by a physical locking or other connection to the siding panel 20 and/or first insulation layer 40, wherein other means of connection may include, but are not limited to, tape, mechanical (e.g., nuts and bolts, screws, nails, staples, hook and loop fasteners, etc.), adhesive (e.g., glue, resins, etc.), friction, and/or other similar or suitable means. In one exemplary embodiment, as aforementioned, a temporary retention system (e.g., tape) may be used to secure a back cover 60 in order to facilitate insertion and removal of at least one additional insulation layer 50, as needed (e.g., to avoid cutting).

The back cover 60 may be made of any material so long as it may be connected to the first cover layer 20 and/or the first insulation layer 40. In one exemplary embodiment, back cover 60 is comprised of the same or similar material as first insulation layer 40. For example, one embodiment of a back cover 60 may be comprised of EPS foam. Other embodiments may utilize other suitable materials for a back cover 60, which may or may not be the same material used for a first insulation layer 40. In some embodiments, a back cover 60 may not be comprised of an insulative material.

Figure 5:
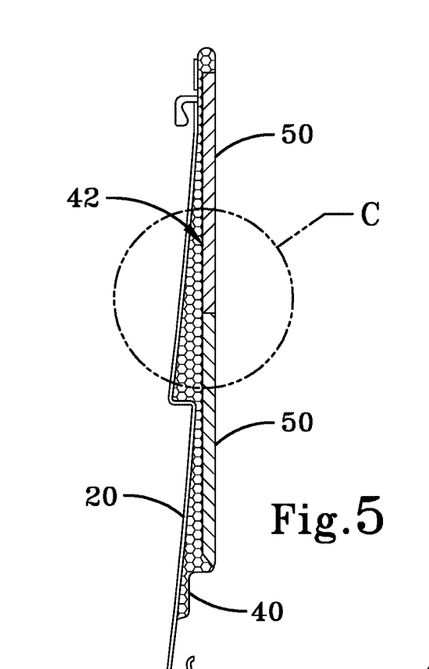
FIG. 5 is a cross-sectional view of an exemplary embodiment of a siding panel assembly, which indicates a Detail C.
Figure 6:
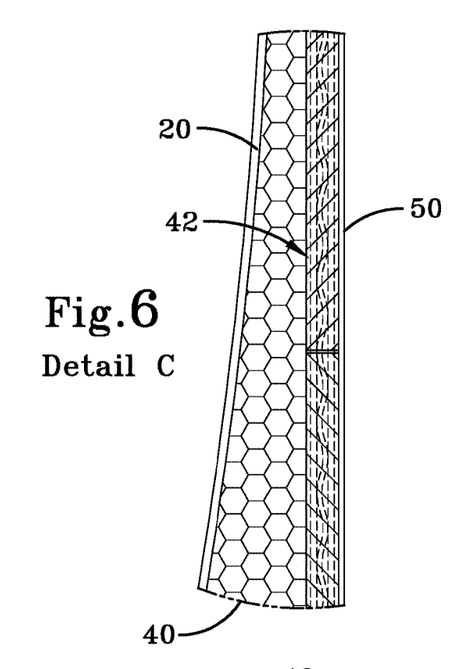
FIG. 6 shows Detail C, wherein the exemplary embodiment is similar to the exemplary embodiment of FIGS. 1-4 except for the absence of a back cover.
Figure 7:
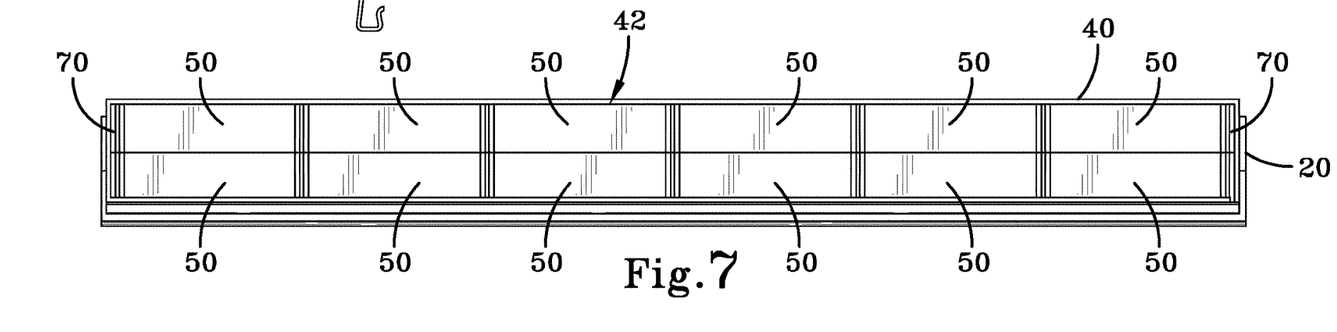
FIG. 7 is a rear elevation view of the siding panel assembly of FIG. 5.

FIGS. 5-7 show an exemplary embodiment that may be similar to the embodiment of FIGS. 1-4 except for the absence of a back cover 60. In this exemplary embodiment, the at least one additional insulation layer 50 may be secured to the siding panel 20 and/or first insulation layer 40 such as by a physical locking or other connection, wherein other means of connection may include, but are not limited to, tape, mechanical (e.g., nuts and bolts, screws, nails, staples, hook and loop fasteners, etc., preferably without compromising any vacuum), adhesives (e.g., glue, resins, etc.), and/or other similar or suitable means. FIG. 7 shows an example where tape 70 is used to secure additional insulation panels 50 to first insulation panel 40 and/or siding panel 20. Again, in an exemplary embodiment, the use of a temporary retention system including, but not limited to, tape, may allow for installation and removal of at least one additional insulation layer 50, as needed (e.g., such as to avoid cutting).

FIG. 7 further shows an example of the use of multiple additional insulation panels 50 that are connected together. In other embodiments, the additional insulation panels in each row and/or column may be separated (e.g., either in the same recessed portion or in separate recessed portions). The use of multiple additional insulation panels 50 may, for example, be necessary when such panels are a set size. As aforementioned, it may also be possible to manufacture or acquire an additional insulation panel of a desired size for an intended purpose, which may eliminate the need to use multiple additional insulation panels.

Figures 8, 9:
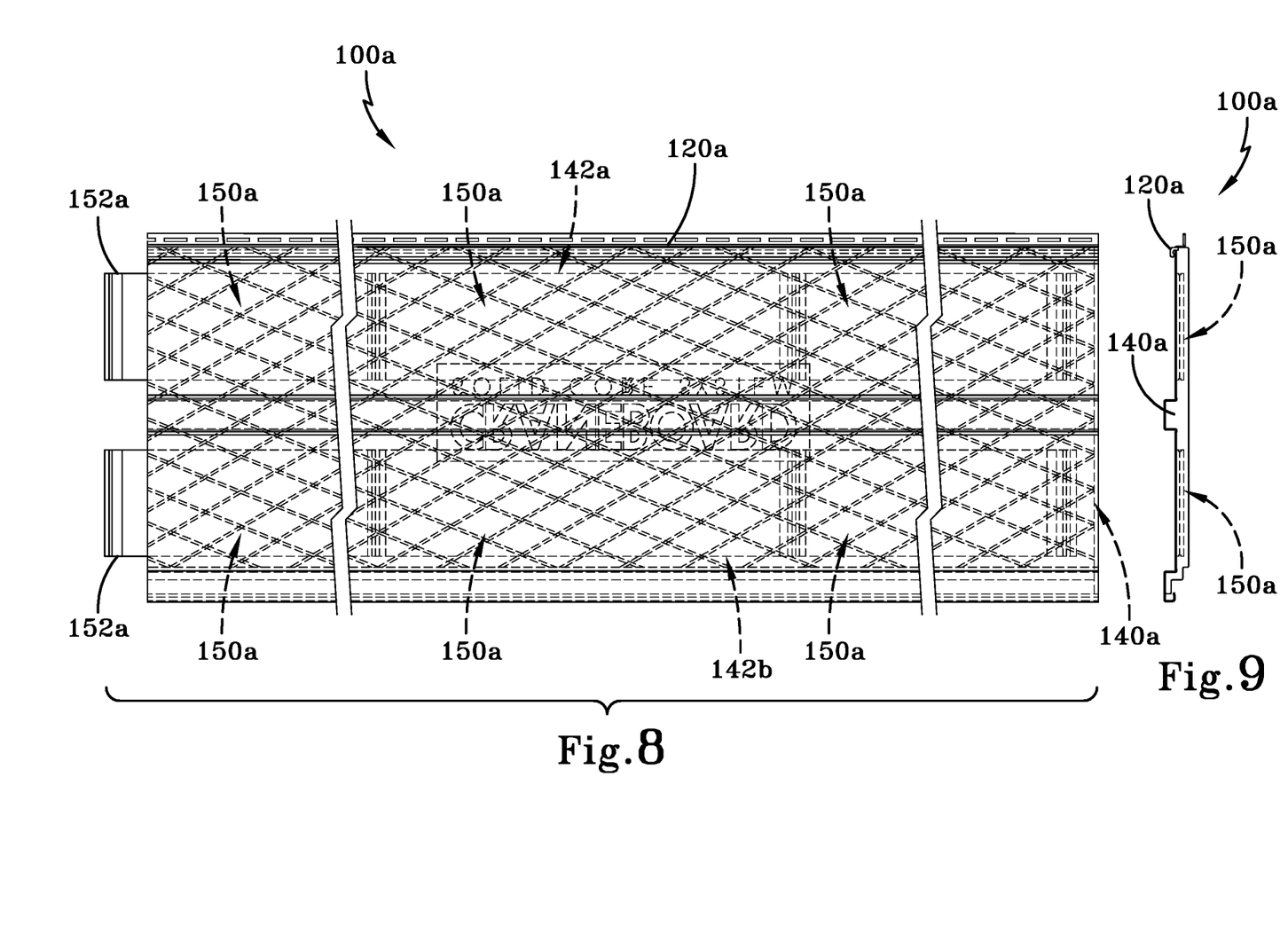
FIG. 8 is a front elevation view of an exemplary embodiment of a siding panel assembly, wherein rear and interior details are indicated with dashed lines.
FIG. 9 is an end elevation view of the siding panel assembly of FIG. 8, wherein high R-value insulation material (within a cavity or pocket of a foam backer) is indicated with dashed lines.

FIGS. 8 and 9 show another exemplary embodiment of a siding panel assembly 100*a* comprising a siding panel 120*a* and a first insulation layer 140*a*. In these views, the additional insulation panels 150*a* and other rear details are shown in dashed lines to facilitate illustration. In this exemplary embodiment, an upper row and a lower row of additional insulation panels 150*a* are situated in recessed portions 142*a*, 142*b* in a front surface (i.e., adjacent to a rear surface of siding panel 120*a*) of first insulation layer 140*a*. In this embodiment, the additional insulation panels 150*a* in each row are connected together. In other embodiments, the additional insulation panels 150*a* in each row may be separated (e.g., either in the same recessed portion or in separate recessed portions). In this exemplary embodiment, the position of the additional insulation panels 150*a* on the front surface of first insulation panel 140*a* allows for siding panel 120*a* to assist with supporting or otherwise holding additional insulation panels 150*a* in recessed portions 142*a*, 142*b*, which may be particularly beneficial for a vertical installation of additional insulation panels 150*a*. Such a position may also facilitate assembly of siding panel assembly 100*a*.

FIGS. 8 and 9 also provide an example of a situation where additional insulation panels 150*a* are a set size and do not properly fit at one end of siding panel assembly 100*a*. In particular, ends portions 152*a* extend beyond one end of first insulation layer 140*a*. In such an embodiment, those additional insulation panels 150*a* may be modified (e.g., cut, trimmed, etc.), if necessary, to achieve a desirable size. In the case of a VIP or MAI panel that is not a proper size, a modified end may be resealed (e.g., taped; capped; bonded with an adhesive, resin, or glue; etc.) to limit the loss of insulative properties. Alternatively, in some other exemplary embodiments, those additional panels 150*a* may, respectively, be overlapped with adjacent panels 150*a* to avoid the need to cut.

Figure 10:
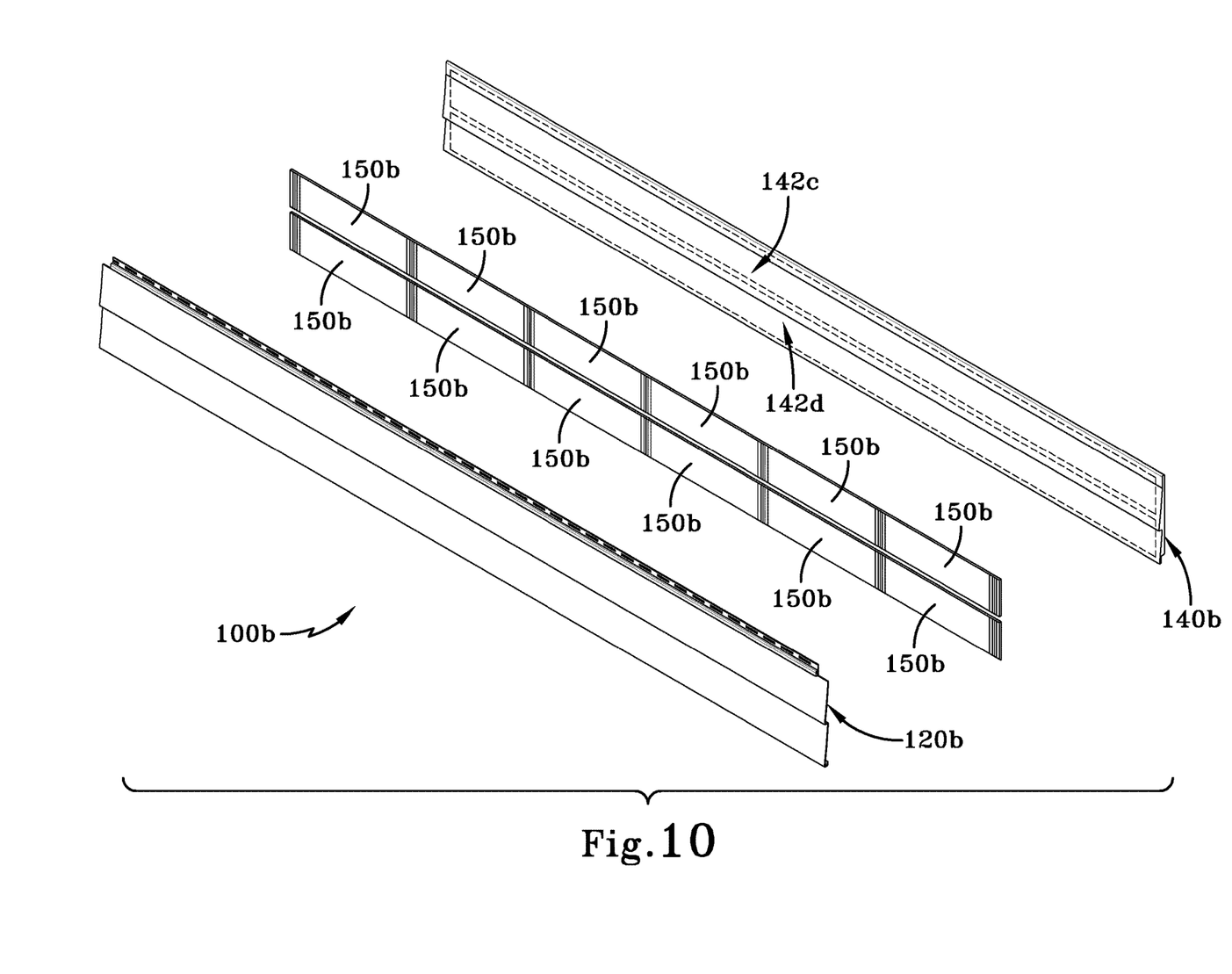
FIG. 10 is an exploded view of an exemplary embodiment of a siding panel assembly.
Figure 11:
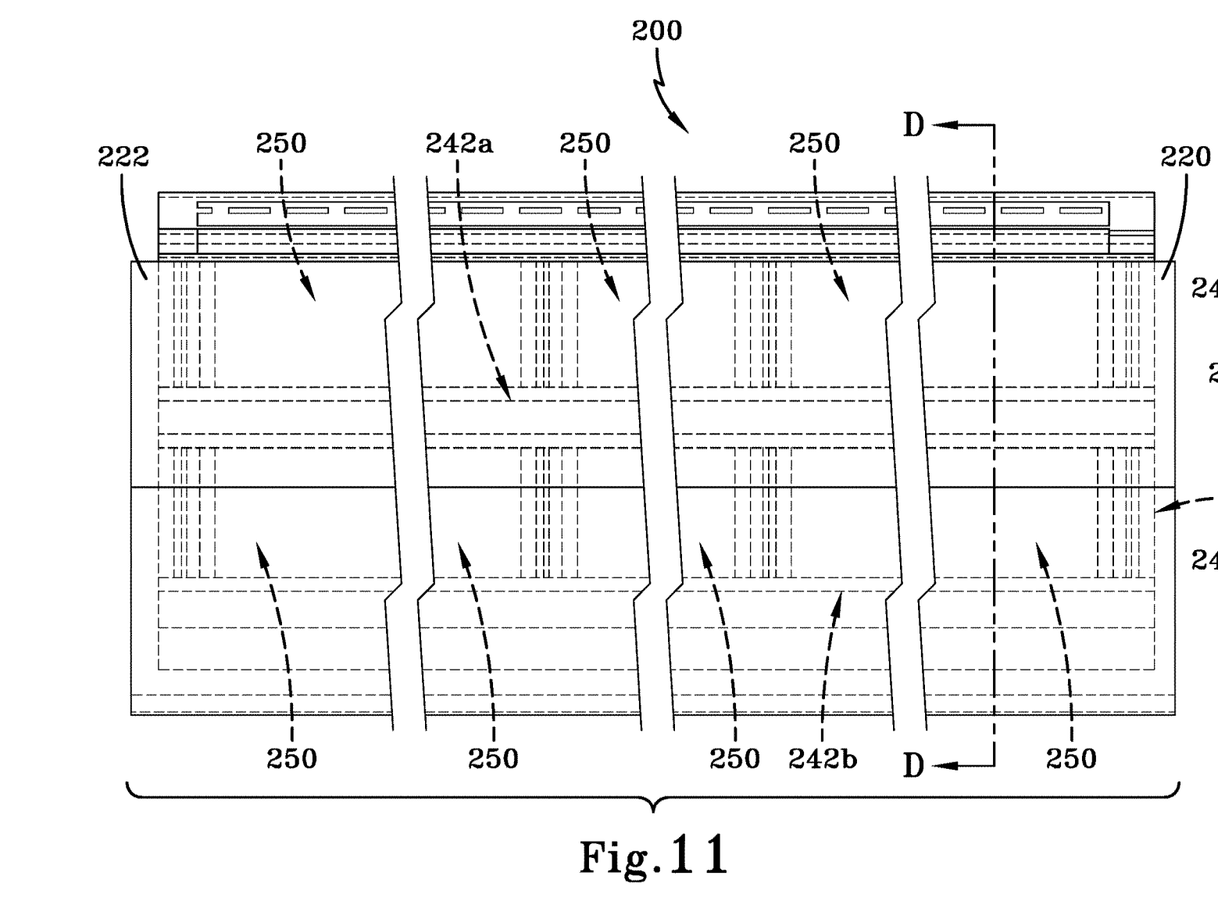
FIG. 11 is a front elevation view of an exemplary embodiment of a siding panel assembly, wherein rear details are indicated with dashed lines and in which a cross-section line D-D is indicated.

FIG. 10 shows another exemplary embodiment of a siding panel assembly 100*b* that may be similar to siding panel assembly 100*a*. This embodiment of siding panel assembly 100*b* comprises a different siding panel 120*b* and first insulation layer 140*b*. This embodiment of first insulation layer 140*b* has an upper recessed portion 142*c* and a lower recessed portion 142d in a front face, which are each set at an angle (i.e., inclined). The inclined angle, along with siding panel 120b, assists with retaining additional insulation panels 150b in recessed portions 142c, 142d. As a result of such features, this embodiment may also facilitate an easier assembly.

FIGS. 11-14 show another exemplary embodiment a siding panel assembly 200. In this exemplary embodiment, a first cover layer 220 has a front face 222 and a back face 224. The front face 222 may, for example, face away from a structure to which the siding panel assembly 200 may be attached. The back face 224 of the first cover layer 220 is attached to the front face 244 of the first insulation layer 240. The first cover layer 220 is attached to the first insulation layer 240 by the means already described, which may include, but are not limited to, tape, mechanical, adhesive, structural, and other similar or suitable means. In this embodiment, a rear face 246 of first insulation layer 240 forms recessed portions 242a, 242b that are adapted to receive additional insulation panels 250.

The recessed portions 242a, 242b may have any suitable size and shape to receive additional insulation panels 250. For example, in some exemplary embodiments, the size and shape may be such that additional insulation panels 250 may have some freedom of movement within recessed portions 242a, 242b (e.g., to allow for differences in expansion and contraction rates between the materials, to facilitate removal of an additional insulation panel 250, etc.). However, in other exemplary embodiments, the size and shape of recessed portions 242a, 242b may be such that there is a tighter fit with additional insulation panels 250 (e.g., to assist with retention of additional insulation layers 250).

The exemplary embodiment of FIGS. 11-14 may be manufactured by any suitable processes. For example, recessed portions 242a, 242b may be formed by molding or a wirecut process. Regarding an example made by a wirecut process, the recessed portions 242a, 242b may extend through the end boundaries of first insulation layer 240 as a result of the process. In that event, additional insulation layers 250 may be placed or slid into position in recessed portions 242a, 242b.

Figure 12:
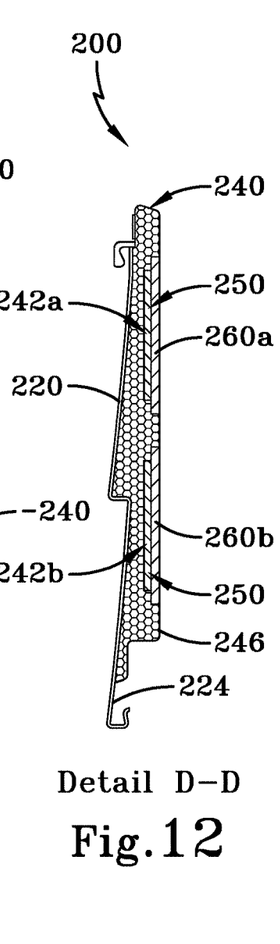
FIG. 12 is a cross-section view of the siding panel assembly of FIG. 11 along line D-D, which shows an example of how a first insulation panel with pockets (e.g., holes) or other recesses may hold additional insulated panels having high R-value in place with or without the help of a retention panel.
Figure 13:
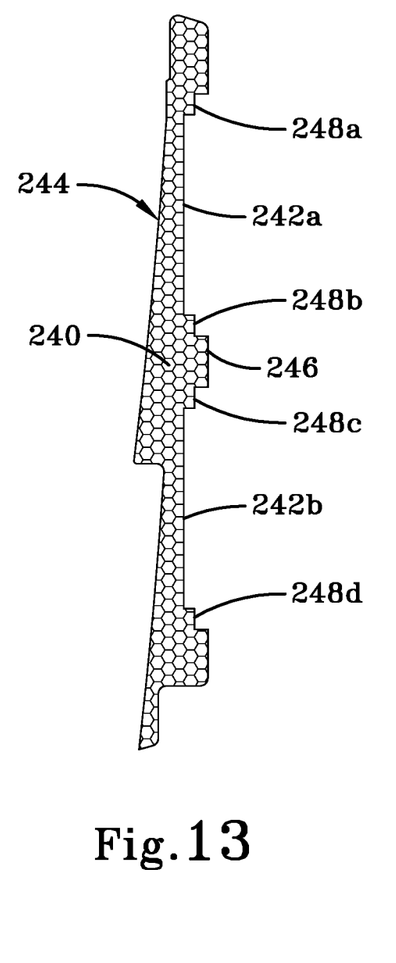
FIG. 13 is an isolated view of the exemplary embodiment of the foam backer in FIG. 12, which shows an example of how a first insulation panel may be shaped (e.g., molded or cut) to fit one embodiment such as by forming a pocket (e.g., a hole) or other recess for the insertion of an additional insulated panel having high R-value.
Figure 14:
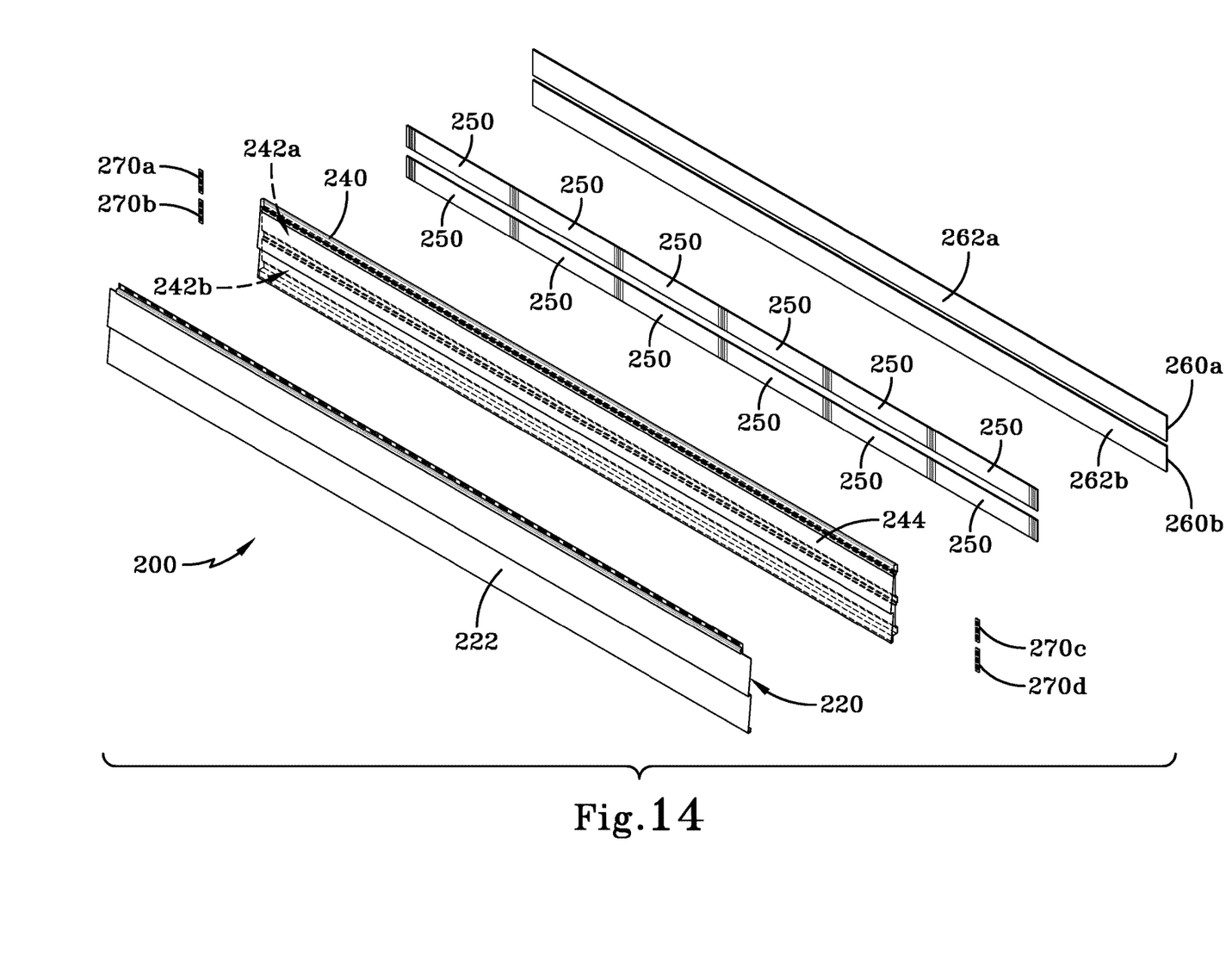
FIG. 14 is an exploded view of the siding panel assembly of FIG. 11, wherein end caps or a sealant may be used to enclose the ends of the siding panel assembly.

In addition, FIGS. 12 and 14 show that at least one optional rear back cover may be used to assist in securing the additional insulation panels 250 to the first insulation panel 240. In this example, rear back covers 260a, 260b are, respectively, adapted to support or otherwise hold additional insulation panels 250 in recessed portions 242a, 242b. In one example, each rear back cover 260a, 260b may have a front face 262a, 262b that may be shaped to match or mate with the shape of the rear face 246 of the first insulation panel 240 when the first insulation panel 240 has the additional insulation panels 250 inserted in it. For instance, in this exemplary embodiment, rear face 246 forms steps 248a, 248b, 248c, 248d that are adapted to facilitate reception of rear back covers 260a, 260b. More particularly, in this exemplary embodiment, recessed portion 242a forms steps 248a, 248b that are adapted to receive front face 262a of rear back cover 260a, and recessed portion 242b forms steps 248c, 248d that are adapted to receive front face 262b of rear back cover 260b. However, in other embodiments, each recessed portion 242a, 242b may have any suitable shape that facilitates the reception of an additional insulation panel 250 (with or without a rear back cover 260a, 260b), and each rear back cover 260a, 260b may have a front face of any suitable shape and design that allows for support of an additional insulation panel 250. For example, in some other embodiments, rear back covers 260a, 260b may not be received in recessed portions 242a, 242b. Whether or not received in recessed portions 242a, 242b, the at least one rear back cover 260a, 260b may be attached to first cover layer 220 and/or first insulation panel 240 by any suitable means including, but not limited to, a physical locking or other connection to the first cover layer 220 and/or first insulation layer 240, wherein other means of connection may include, but are not limited to, tape, mechanical (e.g., nuts and bolts, screws, nails, staples, hook and loop fasteners, etc.), adhesive (e.g., glue, resins, etc.), friction, and/or other similar or suitable means. For example, in this embodiment, an adhesive (e.g., glue) or other means of connection may be used on steps 248a, 248b, 248c, 248d to secure rear back covers 260a, 260b. In another exemplary embodiment, as aforementioned, a temporary retention system (e.g., tape) may be used to secure each back cover 260a, 260b in order to facilitate insertion and removal of at least one additional insulation layer 250, as needed (e.g., to avoid cutting).

FIG. 14 further shows an example of end caps 270a, 270b, 270c, 270d that may be used to seal the ends of the siding panel assembly 200 (e.g., to minimize the effect the environment, to improve insulation properties, and/or to assist in retaining additional insulation layers 250). End caps 270a, 270b, 270c, 270d may be secured to first cover layer 220 and/or first insulation layer 240 such as by a physical locking or other connection, wherein other means of connection may include, but are not limited to, tape, mechanical (e.g., nuts and bolts, screws, nails, staples, hook and loop fasteners, etc.), adhesive (e.g., glue, resins, etc.), friction, and/or other similar or suitable means. In one exemplary embodiment, a temporary retention system (e.g., tape) may be used to secure each end cap 270a, 270b, 270c, 270d in order to facilitate insertion and removal of at least one additional insulation layer 250, as needed (e.g., to avoid cutting).

End caps 270a, 270b, 270c, 270d may be manufactured from any suitable material. In an exemplary embodiment, the material used may be substantially the same or similar as the material used to make the first insulation layer 240. For one example, end caps 270a, 270b, 270c, 270d may be comprised of EPS foam. However, in some other embodiments, the material used may be different than the material used for the first insulation layer 240.

Furthermore, either alternatively or additionally, the ends of the completed insulation panel may be sealed with any sealant that is compatible with the materials used to make the first cover layer 220 and/or first insulation layer 240. For example, the end caps 270a, 270b, 270c, 270d may contain (e.g., a self-sealing cap) or be secured with a sealant to ensure the end caps fit tightly to the siding panel assembly 200. However, other exemplary embodiments (i.e., that have at least one recessed portion that extends through an end boundary of a first insulation layer) may be sealed (e.g., with adhesives, resins, glues, tape, etc.) without the use of an end cap, or may not even be sealed at the end of the first insulation layer. For example, in some embodiments, another accessory or panel may cover an end of the first insulation layer.

In one exemplary embodiment, it is particularly beneficial to form a first insulation panel of an expanded polystyrene (EPS) foam to facilitate reception and/or retainment of VIP or MAI panels. The EPS foam panels may be readily manufactured with a recessed portion (e.g., such as may be formed by molding or cutting) to receive a MAI or VIP panel. In an exemplary process, these first insulation panels may then be easily introduced into an insulated siding assembly process. For example, by modifying various EPS foam board profiles, a system may be designed to mate or otherwise work with various siding products. As a result, at least one recess in the EPS foam board may house the VIP or MAI panel(s), which may eliminate the need to try to glue VIP or MAI panels to the backside of a vinyl panel.

In an exemplary process, the EPS foam cavity may easily be integrated into a pre-assembly operation allowing someone to install the VIP or MAI panels into the cavity of the EPS foam. This composite insulation assembly may then be subsequently run through the assembly line at the construction or installation site without making any changes to the process.

One weakness of a MAI panel is that it relies on vacuum as part of the mechanism to develop high R-value ratings. Because siding panels must sometimes be cut to suit the application, the VIP or MAI panels in some embodiments may be compromised. In that event, some of the insulating properties may be retained or recovered such by taping or otherwise sealing the sides which are cut. Alternatively, some embodiments may allow for the VIP or MAI panels to be removed prior to cutting.

In another embodiment, an EPS insulation panel may be designed that encapsulates the VIP or MAI panel, but also allows it to move within the body of the foam. In such an embodiment, an installer may slide the cut VIP or MAI panels out of position to tape or otherwise seal them, then slide the panels back into place and either cover the opening with a cover and/or cap or leave it open. As another example, if there is room, an installer may instead slide or otherwise take an entire VIP or MAI panel out of the assembly before making the end cuts, and then re-insert the VIP or MAI panel into position (e.g., with some overlap with an adjacent VIP or MAI panel to account for the reduced length of the foam and siding panel).

In an exemplary embodiment, an EPS foam board may also facilitate the formation one large recess or at least one set of smaller recesses. Moreover, a recess may readily be formed in the back side, front side, end, or edge of a foam board. In the backside of the board of one embodiment, a recess may not interfere with the assembly process in terms of gluing the siding panel to the foam board. Such an embodiment may also allow an installer an opportunity to possibly remove the VIP or MAI panels prior to cutting and/or to seal (e.g., tape) any cut ends of the VIP or MAI panels. On the other hand, a front side recess may potentially facilitate easier assembly since the back side of an EPS board is commonly flat and does not have the assistance of a siding panel to assist with retention of a VIP or MAI panel.

Many exemplary embodiments have been described with respect to siding panel assemblies. However, as aforementioned, other types of outer covers (e.g., other types of panels, doors, garage doors, walls, etc.) may also be used. For example, an insulation assembly may also be used for other purposes including, but not limited to, cavity insulation, basement wall insulation, garage door insulation, residential door insulation, etc.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An insulated panel assembly comprising:
   a first cover layer;
   a first insulation layer secured to the first cover layer, the first insulation layer comprising a front face, a rear face, a first end, a second end, and at least one recessed portion in the front face, the rear face, the first end, or the second end; and
   at least one additional insulation layer positioned in the at least one recessed portion of the first insulation layer such that the at least one additional insulation layer is removable from the at least one recessed portion and subsequently re-insertable in the at least one recessed portion to facilitate installation of the insulated panel assembly;
   wherein the at least one additional insulation layer also has freedom of movement within the at least one recessed portion to allow for differences in expansion and contraction rates between the at least one additional insulation layer and the first insulation layer; and
   wherein the at least one additional insulation layer has a higher R-value than the first insulation layer.

2. The insulated panel assembly of claim 1 wherein the at least one additional insulation layer is a vacuum insulated panel.

3. The insulated panel assembly of claim 1 wherein the at least one additional insulation layer is a MAI panel.

4. The insulated panel assembly of claim 1 wherein the first cover layer is a siding panel.

5. The insulated panel assembly of claim 1 wherein the first insulation layer is comprised expanded polystyrene foam.

6. The insulated panel assembly of claim 1 further comprising:
   a back cover secured to the first cover layer or the first insulation layer to assist with retaining the at least one additional insulation layer in the at least one recessed portion of the first insulation layer.

7. The insulated panel assembly of claim 6 wherein the back cover is comprised of expanded polystyrene foam.

8. The insulated panel assembly of claim 1 wherein the at least one recessed portion of the first insulation layer is selected from the group consisting of pockets, holes, cavities, slots, tracks, channels, and openings.

9. The insulated panel assembly of claim 1 wherein the at least one recessed portion is in the front face of the first insulation layer.

10. The insulated panel assembly of claim 1 wherein the at least one recessed portion is in the rear face of the first insulation layer.

11. The insulated panel assembly of claim 1 wherein the at least one recessed portion is in at least one of the first end and the second end of the first insulation layer.

12. A siding panel assembly comprising:
    a siding panel;
    an expanded polystyrene foam layer secured to the siding panel, the expanded polystyrene foam layer comprising a front face, a rear face, a first end, a second end, and at least one recessed portion in the front face, the rear face, the first end, or the second end; and
    at least one additional insulation layer positioned in the at least one recessed portion of the expanded polystyrene foam layer such that the at least one additional insulation layer is removable from the at least one recessed portion and subsequently re-insertable in the at least one recessed portion to facilitate installation of the siding panel assembly;

wherein the at least one additional insulation layer also has freedom of movement within the at least one recessed portion to allow for differences in expansion and contraction rates between the at least one additional insulation layer and the expanded polystyrene foam layer; and wherein the at least one additional insulation layer has a higher R-value than the expanded polystyrene foam layer.

13. The insulated panel assembly of claim 12 wherein the at least one additional insulation layer is a vacuum insulated panel.

14. The insulated panel assembly of claim 12 wherein the at least one additional insulation layer is a MAI panel.

15. The insulated panel assembly of claim 12 further comprising:

a back cover secured to the siding panel or the expanded polystyrene foam layer to assist with retaining the at least one additional insulation layer in the at least one recessed portion of the expanded polystyrene foam layer.

16. The insulated panel assembly of claim 12 wherein the at least one recessed portion of the expanded polystyrene foam layer is selected from the group consisting of pockets, holes, cavities, slots, tracks, channels, and openings.

17. The insulated panel assembly of claim 12 wherein the at least one recessed portion is in the front face of the expanded polystyrene foam layer.

18. The insulated panel assembly of claim 12 wherein the at least one recessed portion is in the rear face of the expanded polystyrene foam layer.

* * * * *